United States Patent [19]
Sarno et al.

[11] Patent Number: 4,915,424
[45] Date of Patent: Apr. 10, 1990

[54] BRANCH FOR OTHER CONTAINMENT SHROUD

[75] Inventors: Russel J. Sarno, Tarzana, Calif.; Patrick Madormo, Higland Beach, Fla.

[73] Assignee: Flo-Control, Inc., Burbank, Calif.

[21] Appl. No.: 227,287

[22] Filed: Aug. 2, 1988

[51] Int. Cl.$^4$ .............................................. F16L 41/00
[52] U.S. Cl. ..................................... 285/156; 285/373
[58] Field of Search .............. 285/156, 419, 421, 913, 285/373

[56] References Cited

U.S. PATENT DOCUMENTS

| | | | |
|---|---|---|---|
| 320,771 | 6/1885 | Ford | 285/373 |
| 1,052,198 | 2/1913 | Wyre | 285/419 X |
| 2,880,761 | 4/1959 | Peter | 285/419 X |
| 3,737,180 | 6/1973 | Hayes, Jr. et al. | 285/373 X |
| 3,944,260 | 3/1976 | Petroczky | 285/156 X |
| 3,982,779 | 9/1976 | Hickey | 285/373 X |
| 4,018,464 | 4/1977 | Acda et al. | 285/421 X |
| 4,018,979 | 4/1977 | Young | 285/373 X |
| 4,273,364 | 6/1981 | DeLange | 285/421 X |
| 4,615,543 | 10/1986 | Cannon | 285/419 X |
| 4,652,023 | 3/1987 | Timmons | 285/373 X |

FOREIGN PATENT DOCUMENTS

| | | | |
|---|---|---|---|
| 1038768 | 10/1953 | France | 285/156 |
| 177939 | 4/1922 | United Kingdom | 285/419 |

Primary Examiner—Thomas F. Callaghan
Attorney, Agent, or Firm—Donald D. Mon

[57] ABSTRACT

A branch shroud for containment conduitry in which shroud halves are brought together with seals at their abutting edges. The abutting edges have interleaved retention devices that receive pins to hold, and perhaps to force, the edges toward each other.

2 Claims, 3 Drawing Sheets

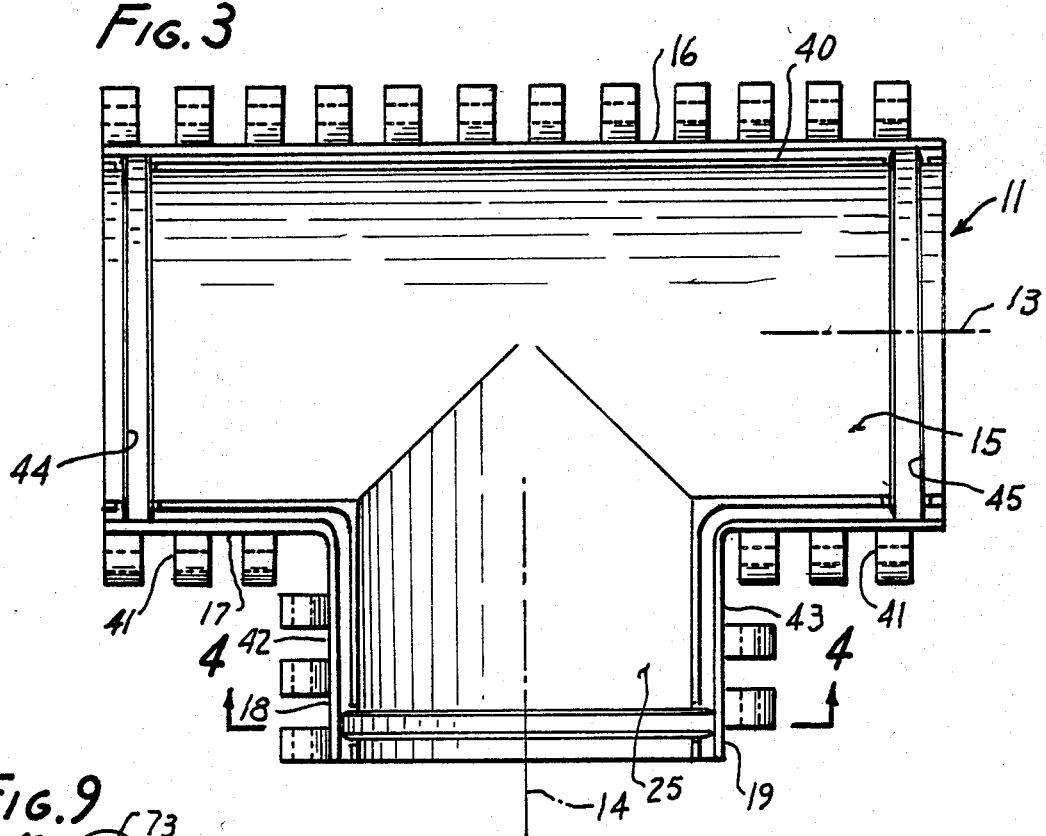
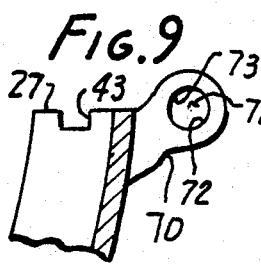
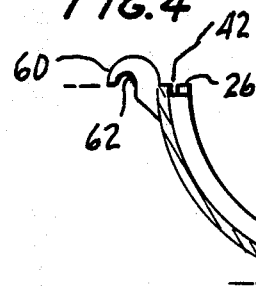
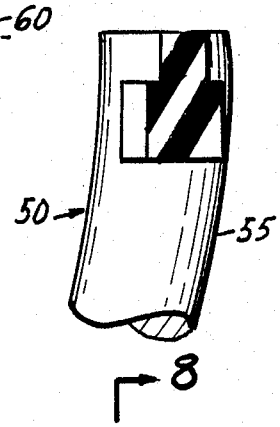
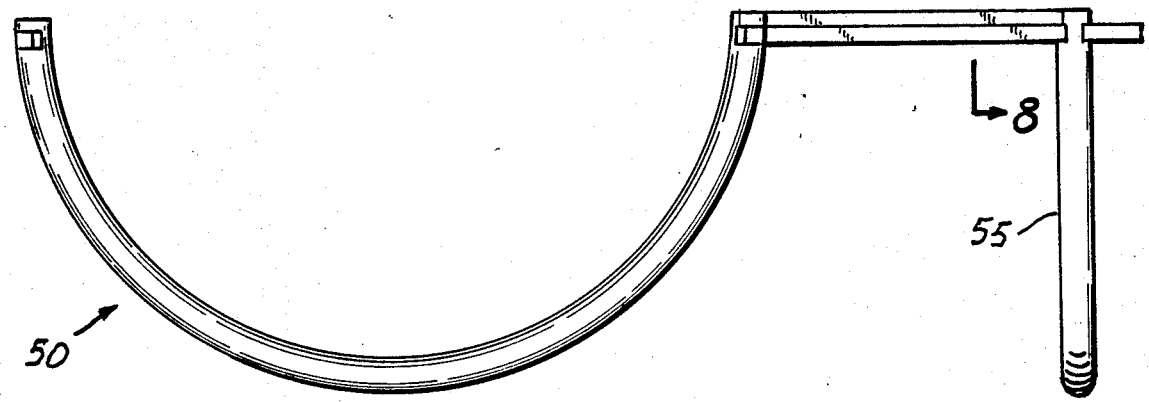

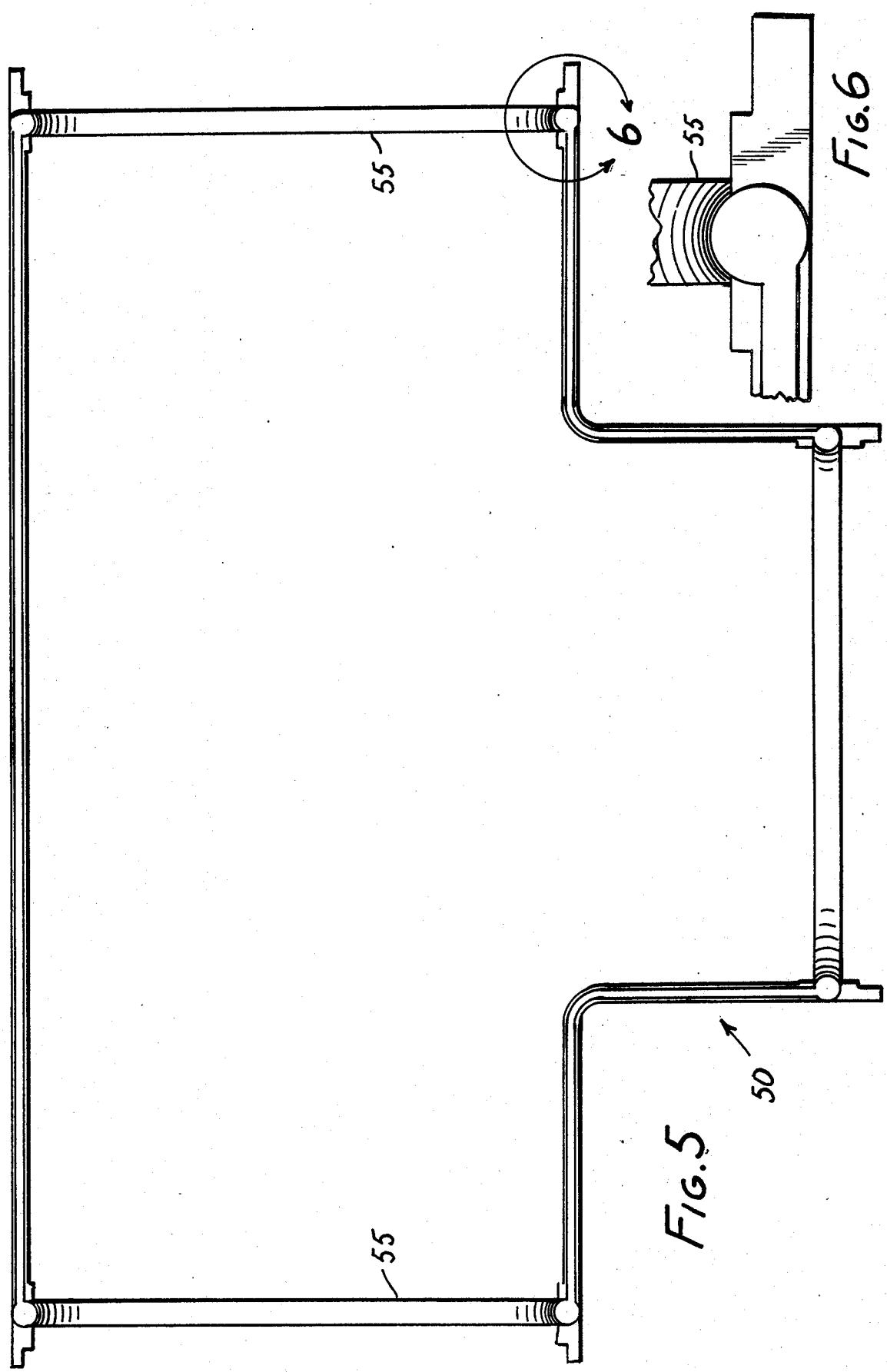

BRANCH FOR OTHER CONTAINMENT SHROUD

FIELD OF THE INVENTION

This invention relates to containment conduitry, in which an inner pipe is surrounded by a containment shroud, and in particular to a branch for the shroud.

BACKGROUND OF THE INVENTION

Piping for the transport of hazardous fluids has proved to involve long term risks to the surrounding environment because of underground leaks. A current example is deteriorating piping used in gasoline service stations, which with age has started to leak gasoline into the ground. In response, there is a general movement toward requiring that such piping be contained, such as by a shroud so that leakage can both be contained and detected. Direct leakage into the ground from the pipe has rarely been detected until after an unacceptable amount of liquid has leaked. This is a danger to the environment, and is an economic loss both in the cost of the lost goods, and in the cost to remove and dispose of the contaminated dirt.

The containment system consists of a coaxial tubular shroud, which outer shroud will contain any leakage. Sensors can be placed in the spacing between the inner pipe and the shroud to give notice that the pipe has leaked.

On straight runs, and even on curved runs of pipe, it is a simple matter to place the pipe inside the shroud and connect both the pipe and the shroud to next assemblies.

However, a branch of the pipe, of which a T is an example, is not amenable to such a simple arrangement, because the inner pipe branch must be fitted into an outer shroud branch. This has proved to be a matter of some complexity.

It is an object of this invention to provide a branch for a containment shroud which can readily be applied over an installed inner pipe branch and connected to adjacent runs of containment conduitry.

Labor to install piping and conduitry of this class is very costly, and the regions in which they are installed are generally cramped and inconvenient. Accordingly it is a further object of this invention to provide a shroud branch which can quickly and easily be installed, with only minimal effort and inconvenience.

BRIEF DESCRIPTION OF THE INVENTION

A branch for a containment shroud according to this invention comprises a pair of matching halves which are axially split along lines parallel to the respective axes of the pipe members which are to be contained. These lines are disposed at shroud edges that are parallel to one another and which are brought together when the halves are joined.

A progression of spaced apart retention members are integral with the halves along the respective edges, and when the edges are brought together bearing faces of the retention members on one edge overlap the bearing faces of an adjacent edge. A pin is passed through these interleaving progressions, so the bearing faces bear against the pin and the pin holds the halves against separation from one another. Thus, the halves can freely be placed over the pipe branch and the pins installed to hold the containment branch as an integral, installed shroud.

Seal means is provided along the adjacent edges to make an abutment seal there, and peripheral half-seals are provided at the ends to seal with the next articles in the containment conduitry.

The above and other features of this invention will be fully appreciated from the following detailed description and the accompanying drawings, in which:

BRIEF DESCRIPTION OF THE DRAWINGS

FIG. 3 is an axial view into one of the shroud halves;

FIG. 4 is a cross-section taken at line 4—4 in FIG. 3;

FIG. 5 is an axial side view of a seal for one of the halves, removed from its respective shroud half;

FIG. 6 is an enlarged fragment of FIG. 5, taken at region 6;

FIG. 7 is a side view of FIG. 5;

FIG. 8 is an enlarged detail, taken at line 8—8 in FIG. 7; and

FIG. 9 is a fragmentary enlarged detail of another embodiment of retention means.

DETAILED DESCRIPTION OF THE INVENTION

Figure 1:
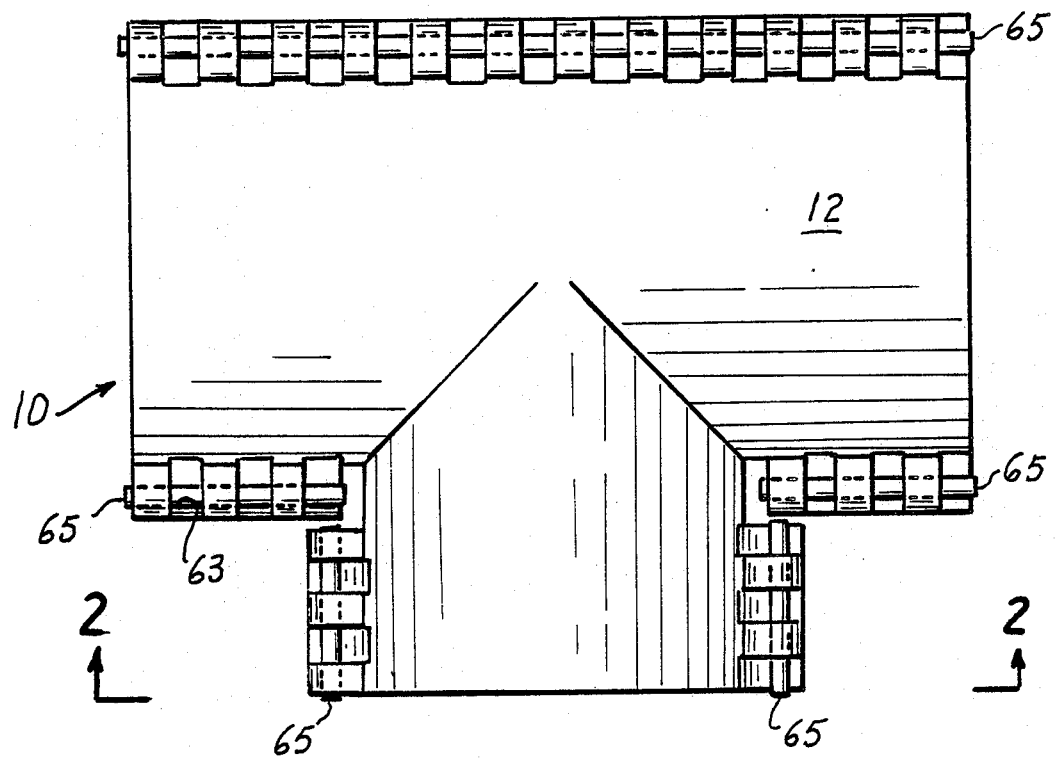
FIG. 1 is a side elevation of a shroud branch according to the invention.
Figure 2:
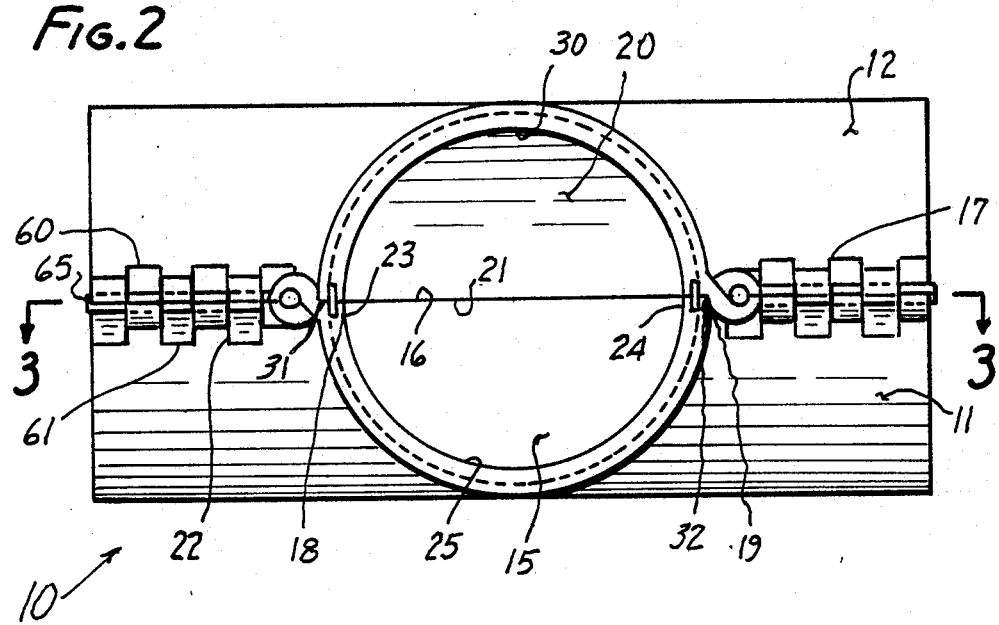
FIG. 2 is a bottom view of FIG. 1.

The purpose of this invention is to provide a shroud which can be assembled to form a containment conduit around a pipe branch. A common form of branch is a T.

Shroud 10 comprises two mating halves 11, 12. Axis 13 extends in a major direction, and axis 14 makes a branching angle with it, in this case 90 degrees. The axes intersect. The angle could be any other desired size should a shroud for something instead of a right angle T be desired.

Wall 15 of half 11 is substantially an axial half cylinder coaxial with axis 13. It has major edges 16, 17 parallel to axis 13 and branching edges 18, 19, which intersect edge 17.

Wall 20 is also substantially an axial half cylinder coaxial with axis 13. It has like major edges 21, 22 parallel to axis 13, and branching edges 23, 24.

Wall 25 of half 11 intersects wall 15. It also is substantially an axial half cylinder, coaxial with axis 14. It has bounding edges 26, 27 parallel to axis 14.

Wall 30 intersects wall 20. It also is substantially an axial half cylinder, coaxial with axis 14. It has branching edges 31, 32 parallel to axis 14.

Both halves have identical seal grooves, so the grooves for only one-half 11 will be shown in detail, the other being identical to it. As shown in FIG. 3, a linear major groove 40 is formed in edge 16, facing outwardly. Another major groove 41 is formed in edge 17 it has linear segments at each side of the branch edges.

Branch grooves 42, 43 are formed in edges 18, 19, and join to the segments of the major groove 41.

End grooves 44, 45 are formed in wall 15 and extend from edge to edge.

It will be seen that the resulting groove system is a complete peripheral surround of major portions of the walls. A seal 50 (FIG. 7) is formed to occupy the groove system. It fits into it as a continuous seal with dimensions which will cause the seal to project beyond the edge or the wall where it fits. The relationship between the dimensions of the grooves and the seal is such that the seals can be deformed on contact with one another so as to make a continuous fluid seal when the edges are brought as close to one another as the design provides for.

The seals in each half are directly opposed to one another. Along the edges they press against one another. Section 55 at the ends instead presses against the next assembly. Customarily this will be the external surface of a conduit which forms a portion of the shroud, or a cap. The walls may, of course, be other than semi-cylindrical, and their sizes relative to one another can vary. The invention is adaptable to a wide range of configurations and sizes. The term "half" is used conceptually, rather than as a geometric limitation.

The halves are held together by retention means that extend along them. The preferred embodiment of retention means is a progression of interleaved fingers 60 along the edges of half 11, and 61 along the edge of half 10.

Each finger has a respective bearing face 62 on fingers 60, and 63 on fingers 61. These are curved and face toward one another when the halves are assembled, a retention pin 65 can be pressed between them to draw the halves toward one another, appropriately deforming the seals. The amount of seal deflection can, within limits, be selected by selecting the diameter of the retention pins.

Alternatively, the retention member can be formed with complete holes, so the retention pin would act much as a piano hinge pin. This arrangement is more troublesome to manufacture and gives up some advantage of adjustability. This arrangement is shown in FIG. 9, wherein a retention number 70 is shown instead of member 60 as presented in FIG. 4. Member 70 is a finger, as in FIG. 4, but with a hole 71 through it having an internal wall 72, a portion 73 of which constitutes a bearing face disposed the same as bearing face 62 in FIG. 4.

The shroud branch is readily installed. The seals will generally be installed at the factory. At the site, the retention pin respective to edge 16 will be put in place and the halves hinged open to fit over the inside piping. Then the halves are hinged toward and against one another.

Pins respective to the segments of edge 17, and to edges 18 and 19 are pressed between the fingers. The shroud branch is now installed. The end seals bear against the next assembly. The edge seals bear against each other. The shroud is thus quickly and conveniently installed. It can as readily be removed, merely by extracting the retention pins.

This invention is not to be limited by the embodiments shown in the drawings and described in the description, which are given by way of example and not of limitation, but only in accordance with the scope of the appended claims.

I claim:

1. A shroud branch for containment conduitry, said branch having a first and a second axis, said axes intersecting each other at an angle, said shroud being adapted to fit to next assemblies, and to house a piping branch with parallel axes, said shroud branch comprising:

a first half and a second half, said halves each having a wall extending along both of said axes, and edges parallel to each of said axes;

seal grooves in each of said edges facing one another when the halves are brought against one another;

a seal groove in each of said walls extending from edge to edge;

a continuous seal fitted in said grooves, said seal projecting beyond its respective edge, and beyond the wall where it fits in the wall, whereby the seals meet along the edges when the halves are brought together, and the seal in the wall is adapted to fit against a contained member;

retention means on all of said edges, and a cylindrical pin engageable with said retention means to hold the halves assembled together;

said retention means comprising a plurality of fingers spaced apart along each of said edges so disposed and arranged that when the halves are brought toward one another they interleave with adjacent fingers along corresponding edges, each finger having a bearing face facing in an opposite direction from the bearing faces on the opposite half, and dimensioned such that the seals are first brought into contact with an opposite seal or a surface to be sealed against, and the pin cannot then be placed between and against all of the bearing faces, compressive deformation of said seals by forcing the halves toward one another aligning said bearing faces with the pin and enabling the pin to be shoved between them so as to hold the halves together with the seals in compressive resilient deformation.

2. A shroud according to claim 1 in which said fingers have a respective hole therethrough to pass the retention pin, said bearing face of each hole being formed by a portion of the wall of said hole.

* * * * *